United States Patent

[11] 3,626,465

| [72] | Inventor | Archie John Hirst<br>Leicester, England |
|---|---|---|
| [21] | Appl. No. | 858,701 |
| [22] | Filed | Sept. 17, 1969 |
| [45] | Patented | Dec. 7, 1971 |
| [73] | Assignee | The Dunlop Company Limited<br>London, England |
| [32] | Priority | Sept. 19, 1968 |
| [33] | | Great Britain |
| [31] | | 44,465/68 |

[54] ELASTOMERIC RAILWAY AXLE SPRING
7 Claims, 4 Drawing Figs.

[52] U.S. Cl.................................................. 105/224.1,
    105/197 A, 105/206, 295/361 R
[51] Int. Cl....................................................B60b 35/16,
    B61f 5/30, B61f 5/34
[50] Field of Search......................................... 105/197,
    197 A, 224, 224.1, 222, 223, 197 R, 206; 295/36 R

[56] References Cited
UNITED STATES PATENTS

| 2,029,749 | 2/1936 | Webb............................ | 105/223 |
| 2,229,429 | 1/1941 | Travilla, Jr. .................. | 105/222 |
| 2,250,568 | 7/1941 | Borup........................... | 105/224.1 X |
| 2,802,662 | 8/1957 | Hirst............................. | 105/224 X |
| 2,841,096 | 7/1958 | Hirst............................. | 105/197 A |
| 3,099,967 | 8/1963 | Hirst et al. .................... | 105/224.1 |

Primary Examiner—Arthur L. La Point
Assistant Examiner—Howard Beltran
Attorney—Harness, Dickey & Pierce ABSTRACT: A vehicle axle suspension spring formed from at least one block of resilient material arranged between metal end plates, one end plate being arranged to be associated with one end of the axle and the other end plate having two spaced semicircular recesses formed therein for engagement with a pair of correspondingly spaced pins associated with a support structure of the vehicle body, so locating the spring relative to the support structure.

ELASTOMERIC RAILWAY AXLE SPRING

This invention relates to vehicle axle suspension systems, particularly for railway vehicle bogies.

In a known form of railway vehicle bogie the axles are located relative to the bogie by means of rubber springs of the kind comprising a stack of V-shaped rubber blocks interleaved with V-shaped metal plates interposed between the axle boxes and the side members of the bogie. Inclined seats, cast integrally with the side members, may be provided for engagement with the end plates of he springs. With this arrangement the inclined seats must be positioned on the side members with a high degree of accuracy to ensure that the axles can be arranged in the desired position with respect to each other and the bogie and no allowance can be made for variations in the dimensions of individual springs due to, for example, shrinkage of the rubber blocks.

One object of the present invention is to provide an improved means of locating an axle of a railway vehicle bogie.

According to one aspect of the invention a vehicle axle suspension spring is formed from at least one block of resilient material arranged between metal end plates, one end plate being arranged to be associated with one end of the axle and the other end plate having an open socket formed therein for engagement with a member of coperating configuration associated with a support structure of the vehicle body for location of the spring relative to the support structure.

According to a further aspect of the invention a railway vehicle bogie comprises two side members arranged one on each side of the bogie and at least one axle having an axle box at each end, each axle box having two springs associated therewith, the springs being formed from at least one block of resilient material arranged between metal end plates, one end plate being associated with the axle box and the other end plate having formed therein an open troughlike recess for engagement with a pin of cooperating configuration secured to the associated side member.

Preferably the springs are of the "chevron" type, that is, they comprise a stack of V-shaped resilient blocks having V-shpaed metal plates interleaved therebetween and interposed between V-shaped metal end plates.

Preferably also the open troughlike recesses are of semicircular form and the pins are of circular cross section, two spaced semicircular recesses being provided on each spring for engagement with a pair of correspondingly spaced pins.

One embodiment of the invention will now be described by way of example with reference to the accompanying drawings in which.

A railway vehicle bogie has two side members 1 arranged one on each side of the bogie. Each side member 1 is in the form of a cast-steel box construction. Each axle associated with the bogie has an axle box 2 at each end and the side members 1 have cutout portions to accommodate the axle boxes 2.

Figure 1:
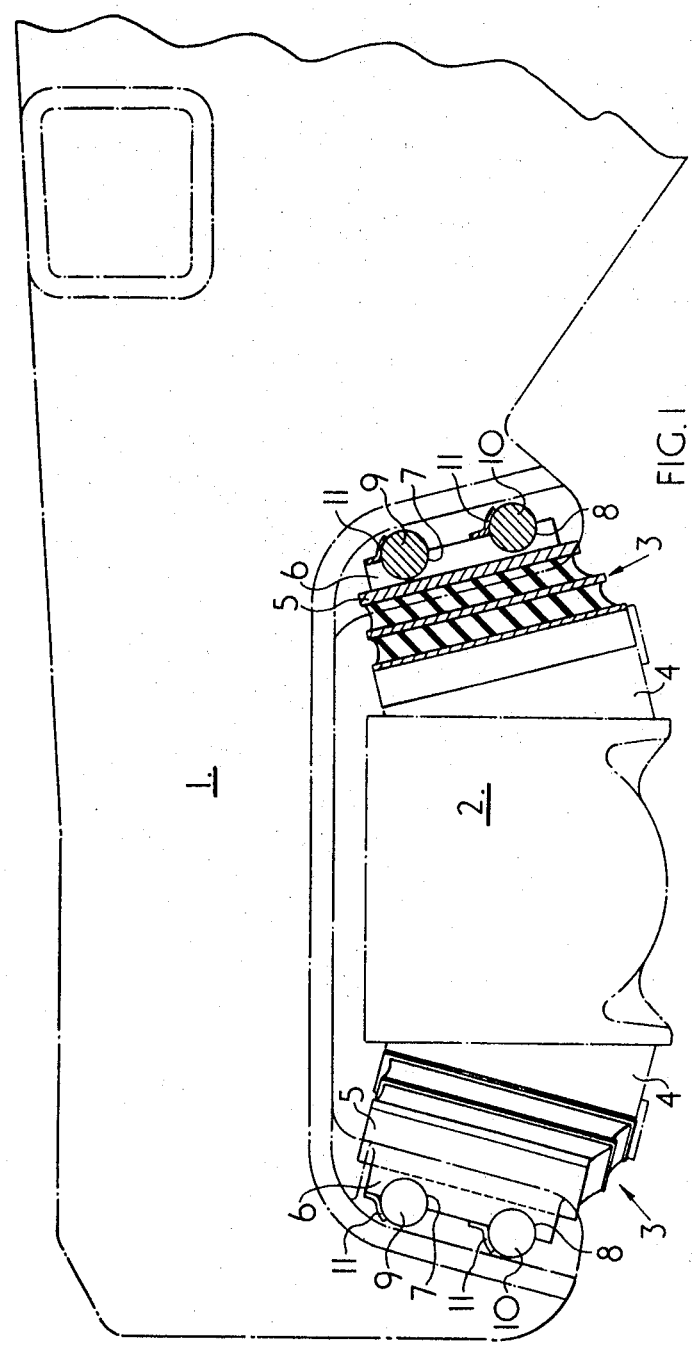
FIG. 1 is a part-sectional side view of a railway bogie incorporating suspension springs according to the invention.
Figure 2:
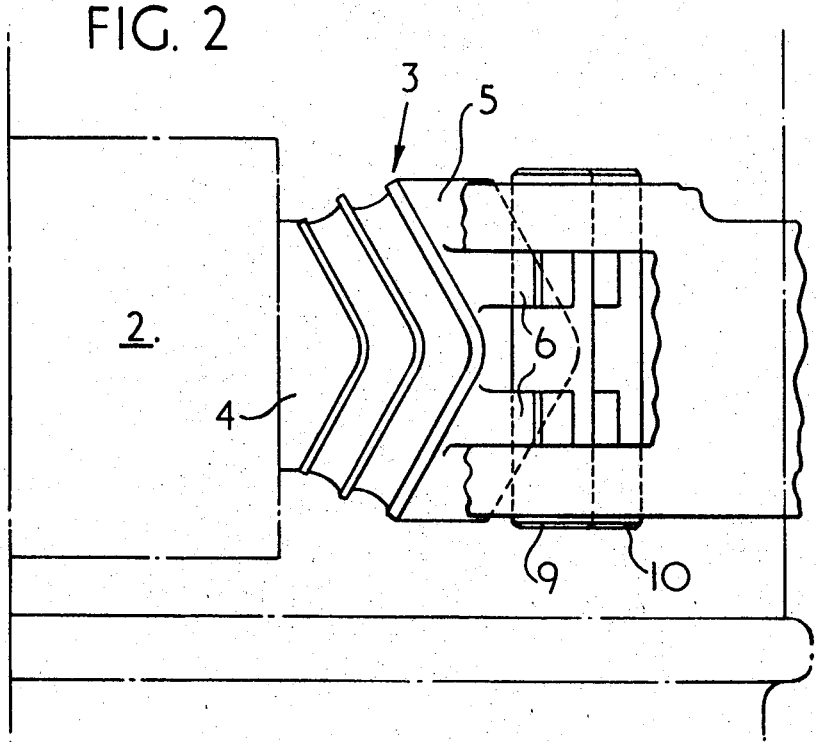
FIG. 2 is a plan view of part of the railway vehicle bogie shown in FIG. 1.

FIG. 1 shows one axle box 2 located relative to the associated side member 1 by means of two springs 3 of the chevron type mounted between the axle box 2 and the side member 1 and arranged one on each side of the axle box 2 so that each spring 3 appears V-shaped in plan view with the apex pointing towards the side member 1 (as seen in FIG. 2).

Each spring 3 engages, at one end, a V-shaped abutment 4 formed on the axle box 2. The end plate 5 at the other end of the spring 3 has two parallel vertically extending abutments 6 formed thereon in positions equally spaced one on each side of the center line of the spring 3. Two pairs of semicircular recesses 7, 8 are formed in the abutments 6, the recesses of each pair being arranged one to each abutment 6 with their axes aligned and parallel to the axis of an associated wheel and the two pairs 7, 8 being vertically spaced. Two pine 9, 10 of circular cross section are arranged with their axes parallel to the wheel axis and passing through holes bored in the side member 1. The two pins 9, 10 are vertically spaced and engage respectively the two pairs of recesses 7, 8 formed in the end plate 5, each pair of recesses acting as an open socket in the form of an open-ended trough of semicircular form to receive one of the pins 9, 10.

With arrangement the pins 9, 10 are secured to the side members 1 by boring holes through the side members 1 in predetermined positions to receive the pins 9, 10 and thus the axles can be more accurately positioned parallel to each other and with the axle boxes 2 at the desired positions relative to the side members 1.

An additional advantage of the arrangement described above is that in the manufacture of the spring adjustment to compensate for variations in the dimensions of the spring due to, for example, shrinkage of the rubber, can be made by appropriate positioning and finishing of the recesses 7, 8.

The pins 9, 10 are normally kept in engagement with the recesses by the weight of the bogie, however, tabs 11 may be fitted to the end plates 5 to engage the pins 9, 10 and prevent disengagement of the pins 9, 10 from the recesses 7, 8 which may occur for example during transportation of the bogie involving lifting the bogie.

Figure 3:
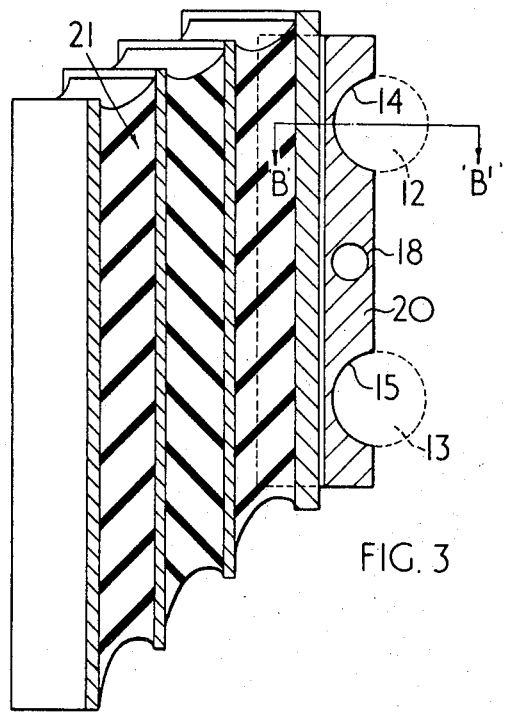
FIG. 3 is a sectional side view, on the line A–A of FIG. 4, of a modified form of suspension spring according to the invention.
Figure 4:
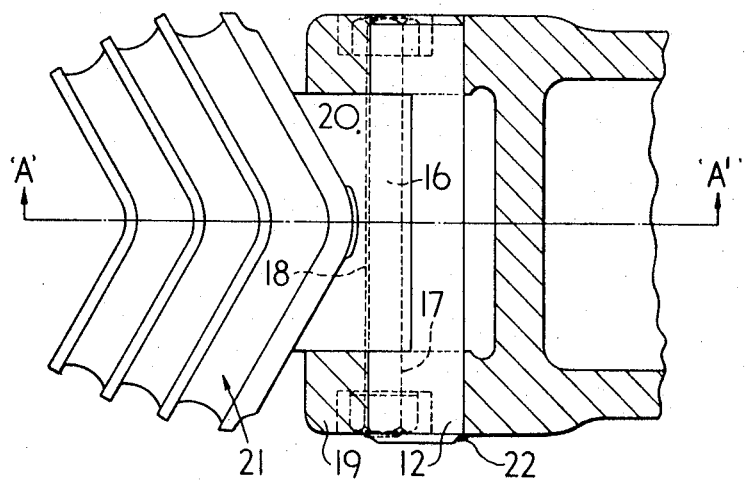
FIG. 4 is a plan view of the modified form of suspension spring shown in FIG. 3 with additional detail showing the attachment to the side member in section on the line B–B' of FIG. 3.

Alternatively in a modification of the embodiment described above and shown in FIGS. 3 and 4, pins 12, 13 may be kept in engagement with recesses 14, 15 of each spring 21 by means of a bolt 16 arranged between the pins and engaging bores 17, 18 formed respectively in a part of the side member 19 and in the end plate 20 of the spring 21. Axial movement of the pins in the recesses may also be prevented by tack welding, see detail 22, the pins to the outer face of the side member 19.

A mounting for a spring in a railway vehicle bogie suspension as described above provides a simple, inexpensive method of ensuring accurate location of an associated axle.

What I claim is:

1. A spring arrangement for suspending and positioning a vehicle axle relative to a vehicle component, said spring arrangement comprising at least one block of resilient material affixed to metal end plates, one of said end plates being adapted to be affixed relative to the axle, at least one recess accurately formed in the other of said end plates, and a locating component complementary to and received within said recess for positioning said locating component with respect to said other end plate, said locating component being adapted to be accurately positioned relative to the associated vehicle component for accurately positioning the axle relative thereto.

2. A spring arrangement as set forth in claim 1 wherein the recess has an open through shape.

3. A spring arrangement as set forth in claim 2 wherein there are a pair of trough-shaped recesses and a pair of cooperating locating components.

4. A spring for locating a vehicle axle comprising a plurality of V-shaped blocks of resilient material having V-shaped metal plates interleaved therebetween, a first end plate affixed to one end of said spring, a second end plate affixed to the other end of said spring, and a pair of trough-shaped recesses formed in said second end plate and accurately positioned therein.

5. A spring as set forth in claim 4 further including means for retaining a pair of locating components within said recesses.

6. A spring as set forth in claim 5 wherein the retaining means comprises a pair of clips affixed to said end plate and positioned contiguous to said recesses.

7. A spring as set forth in claim 5 wherein the retaining means comprises a bore extending through said other end plate and adapted to receive a fastening pin or the like.